United States Patent
Miyashita (10) Patent No.: US 10,778,696 B2
(45) Date of Patent: Sep. 15, 2020

(54) VEHICLE-MOUNTED RELAY DEVICE FOR DETECTING AN UNAUTHORIZED MESSAGE ON A VEHICLE COMMUNICATION BUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yukihiro Miyashita, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 78 days.

(21) Appl. No.: 15/736,833

(22) PCT Filed: Jun. 10, 2016

(86) PCT No.: PCT/JP2016/067333
§ 371 (c)(1),
(2) Date: Dec. 15, 2017

(87) PCT Pub. No.: WO2016/204081
PCT Pub. Date: Dec. 22, 2016

(65) Prior Publication Data
US 2018/0367546 A1    Dec. 20, 2018

(30) Foreign Application Priority Data

Jun. 17, 2015 (JP) ................... 2015-122015

(51) Int. Cl.
*H04L 29/06*     (2006.01)
*H04L 12/46*     (2006.01)
(Continued)

(52) U.S. Cl.
CPC ............. *H04L 63/126* (2013.01); *H04B 3/36* (2013.01); *H04L 12/28* (2013.01); *H04L 12/40* (2013.01);
(Continued)

(58) Field of Classification Search
CPC ... H04L 63/1416; H04L 43/10; H04L 63/123; G06F 8/65
(Continued)

(56) References Cited

U.S. PATENT DOCUMENTS 9,426,164 B2 * 8/2016 Otsuka .................. H04L 63/123
2011/0238260 A1   9/2011 Kotani et al.
(Continued)

OTHER PUBLICATIONS

Search Report for PCT/JP2016/067333, dated Aug. 30, 2016.

*Primary Examiner* — Bryan F Wright
(74) *Attorney, Agent, or Firm* — Honigman LLP (57) ABSTRACT

Provided is a vehicle-mounted relay device, a vehicle-mounted communication system, and a relay program configured to prevent an unauthorized message from being relayed between networks. A vehicle-mounted relay device includes a plurality of communication units to which a plurality of CAN buses are connected and determines whether a message transmitted by any ECU connected to the CAN buses are authorized. If a message is unauthorized, then the vehicle-mounted relay device 10 gives, to the respective CAN bus connected to the communication unit receiving the message, a notification that the unauthorized message has been transmitted. The vehicle-mounted relay device prohibits further relaying of a message that has the (Continued)

same CAN-ID as the CAN-ID contained in the message determined to be unauthorized. Concurrently, the vehicle-mounted relay device gives, to the other communication lines connected to a communication unit, a notification that relay of the message is prohibited.

4 Claims, 8 Drawing Sheets

(51) Int. Cl.
    *H04L 12/28*     (2006.01)
    *H04B 3/36*     (2006.01)
    *H04L 12/40*     (2006.01)
    *H04L 12/26*     (2006.01)

(52) U.S. Cl.
    CPC .......... *H04L 12/46* (2013.01); *H04L 12/4625* (2013.01); *H04L 63/08* (2013.01); *H04L 43/10* (2013.01); *H04L 2012/40215* (2013.01)

(58) Field of Classification Search
    USPC .......................................................... 726/4
    See application file for complete search history.

(56) References Cited

U.S. PATENT DOCUMENTS

| | | | |
|---|---|---|---|
| 2013/0104231 A1* | 4/2013 | Niner ................. H04L 63/1416 726/23 |
| 2013/0134730 A1 | 5/2013 | Ricci |
| 2013/0135118 A1 | 5/2013 | Ricci |
| 2013/0138714 A1 | 5/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Ricci |
| 2013/0166097 A1 | 6/2013 | Ricci |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0218412 A1 | 8/2013 | Ricci |
| 2013/0219039 A1 | 8/2013 | Ricci |
| 2013/0231800 A1 | 9/2013 | Ricci |
| 2013/0282238 A1 | 10/2013 | Ricci et al. |
| 2013/0282946 A1 | 10/2013 | Ricci |
| 2013/0293364 A1 | 11/2013 | Ricci et al. |
| 2013/0293452 A1 | 11/2013 | Ricci et al. |
| 2014/0036693 A1* | 2/2014 | Mabuchi ................. H04L 43/10 370/243 |
| 2014/0109080 A1 | 4/2014 | Ricci |
| 2014/0143839 A1 | 5/2014 | Ricci |
| 2014/0306799 A1 | 10/2014 | Ricci |
| 2014/0306814 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |
| 2014/0309806 A1 | 10/2014 | Ricci |
| 2014/0309813 A1 | 10/2014 | Ricci |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309923 A1 | 10/2014 | Ricci |
| 2014/0309927 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310277 A1 | 10/2014 | Ricci |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310788 A1 | 10/2014 | Ricci |
| 2015/0006035 A1 | 1/2015 | Ricci |
| 2015/0020152 A1 | 1/2015 | Litichever et al. |
| 2015/0066239 A1 | 3/2015 | Mabuchi |
| 2016/0266886 A1* | 9/2016 | Sarkar ..................... G06F 8/65 |
| 2016/0323287 A1* | 11/2016 | Kishikawa ............. H04L 63/10 |
| 2016/0373449 A1* | 12/2016 | Haga ..................... G08G 1/162 |
| 2016/0378457 A1* | 12/2016 | Adachi ................. H04L 63/123 713/181 |
| 2017/0244594 A1* | 8/2017 | Shiota ................... H04L 43/16 |
| 2018/0288000 A1* | 10/2018 | Inoue ..................... H04L 29/14 |
| 2019/0191020 A1* | 6/2019 | Hamada ................. B60R 16/023 |

\* cited by examiner

VEHICLE-MOUNTED RELAY DEVICE FOR DETECTING AN UNAUTHORIZED MESSAGE ON A VEHICLE COMMUNICATION BUS

CROSS-REFERENCE TO RELATED APPLICATIONS

This application is the U.S. national stage of PCT/JP2015/067333 filed Jun. 10, 2016, which claims priority of Japanese Patent Application No. JP 2015-122015, filed Jun. 17, 2015.

TECHNICAL FIELD

The present invention relates to a vehicle-mounted relay device that relays a message between a plurality of networks provided in a vehicle, a vehicle-mounted communication system that includes the vehicle-mounted relay device, and a relay program that is executed in the vehicle-mounted relay device.

BACKGROUND

Conventionally, the CAN communication protocol is widely used for communication between a plurality of communication devices installed in a vehicle. Vehicle-mounted communication systems that employ the CAN communication protocol have a configuration in which a plurality of communication devices are connected to a common CAN bus, and perform message transmission and reception such that a communication device on the reception side acquires a signal output from a communication device on the transmission side to the CAN bus. With the multi-functionalization and high-functionalization of vehicles, communication devices are multi-functionalized and high-functionalized, which increases the number of the communication devices and the amount of data to be transmitted and received between the communication devices, causing the problem that communication loads increase. Accordingly, typically, a configuration is employed in which the communication devices are divided into a plurality of groups, a plurality of communication devices in each group are connected to each other via a common communication line so as to perform data transmission and reception therebetween, and data transmission and reception between the groups are relayed by a vehicle-mounted relay device such as a gateway, so that an increase in communication loads is suppressed.

In the vehicle-mounted communication systems, for example, a malicious device may be connected to the CAN bus, or a regular communication device may malfunction due to, for example, an electronic virus or the like. Such a device may perform, for example, unauthorized message transmission to the CAN bus, causing a regular communication device connected to the CAN bus to malfunction. Accordingly, techniques have been investigated for preventing malfunction or the like of a regular communication device due to an unauthorized message transmitted from an unauthorized communication device.

JP 2013-38711A has proposed a communication management device for a vehicle network that restricts the input of external data. The communication management device monitors data on a CAN bus and data that is externally input, and restricts transmission of the external data if the usage rate of the CAN bus exceeds a load reference value and if the usage rate of the CAN bus is predicted to exceed the load reference value due to transfer of the external data.

The communication management device according to JP 2013-38711A is configured to determine whether or not the usage rate of the CAN bus exceeds a load reference value, and thus has the problem that it cannot restrict transmission if the amount of message transmission with a malicious device is small.

The present invention was made in view of the above-described circumstances, and it is an object thereof to provide a vehicle-mounted relay device, a vehicle-mounted communication system, and a relay program with which it is possible to detect transmission of an unauthorized message, and prevent the unauthorized message from being relayed between networks.

SUMMARY

According to the present invention, a vehicle-mounted relay device is to be installed in a vehicle, is provided with a plurality of communication units to which communication lines are connectable, and is configured to transmit a message received by one of the communication units to the communication line connected to another communication unit so as to perform processing of relaying the message, the message containing identification information for identifying the message, the vehicle-mounted relay device including: a determination unit configured to determine whether or not the message received by the communication unit is authorized; a first notification unit configured to output, to the communication line connected to a communication unit that has received a message determined to be unauthorized by the determination unit, a notification that the unauthorized message has been transmitted; a prohibition unit configured to prohibit any further relaying of a message that has the same identification information as the identification information contained in the message determined to be unauthorized by the determination unit; and a second notification unit configured to output, to the communication line connected to a communication unit other than the communication unit that has received the message determined to be unauthorized by the determination unit, a notification that relay of the message is prohibited.

Furthermore, the vehicle-mounted relay device according to the present invention may further include: a storage unit configured to store the identification information contained in the message determined to be unauthorized by the determination unit; and a third notification unit configured to output, when an ignition switch of the vehicle is switched from an OFF state to an ON state, a notification of the identification information stored in the storage unit to the communication lines connected to the plurality of communication units.

Furthermore, the vehicle-mounted relay device according to the present invention may be such that the first notification unit and the second notification unit perform notification of the identification information contained in the message determined to be unauthorized by the determination unit.

Furthermore, according to the present invention, a vehicle-mounted communication system includes: the above-described vehicle-mounted relay device; and a plurality of communication devices that are connected to one of the plurality of communication lines connected to the communication units of the vehicle-mounted relay device, and transmit and receive a message through the communication line, wherein the communication devices include: a storage unit configured to store identification information notified by the vehicle-mounted relay device; and a discarding unit configured to, if a message containing the identification information stored in the storage unit is received, discard the message.

Furthermore, according to the present invention, a relay program for causing a vehicle-mounted relay device that is installed in a vehicle, is provided with a plurality of communication units to which communication lines are connected, and is configured to transmit a message received by one of the communication units to the communication line connected to another communication unit so as to perform processing of relaying the message that contains identification information for identifying the message, to determine whether or not the message received by the communication unit is authorized, to output, to the communication line connected to a communication unit that has received a message determined to be unauthorized, a notification that the unauthorized message has been transmitted, to prohibit any further relaying of a message that has the same identification information as the identification information contained in the message determined to be unauthorized, and to output, to the communication line connected to a communication unit other than the communication unit that has received the message determined to be unauthorized, a notification that relay of the message is prohibited.

According to the present invention, the vehicle-mounted relay device that includes a plurality of communication units to which a plurality of communication lines are connected determines whether or not a message transmitted by a communication device connected to a communication line is authorized. If it is determined that the message is unauthorized, then the vehicle-mounted relay device outputs, to the communication line connected to the communication unit that has received this message, a notification that the unauthorized message has been transmitted. Accordingly, the other communication device connected to the communication line to which the communication device that has transmitted the unauthorized message is connected can perform processing such as discarding a received message in accordance with the notification from the vehicle-mounted relay device.

Furthermore, the vehicle-mounted relay device prohibits any further relaying of a message that has the same identification information as the identification information contained in the message determined to be unauthorized. At this time, the vehicle-mounted relay device outputs, to the communication line connected to a communication unit (that is, the communication unit that is to relay the message normally) other than the communication unit that has received the message determined to be unauthorized, a notification that relay of the message is prohibited. Accordingly, the communication device that is to receive a relayed message can recognize that relay of the message is prohibited, and can execute, for example, error processing that corresponds to this.

Furthermore, the vehicle-mounted relay device of the present invention stores the identification information contained in the message determined to be unauthorized, and outputs, when the ignition switch of the vehicle is switched from the OFF state to the ON state, a notification of the stored identification information to the communication lines connected to the communication units. Accordingly, even if a communication device to which power supply is stopped when the ignition switch is in the OFF state and that loses stored information is included, it is possible to notify communication devices of the identification information contained in messages determined to be unauthorized, and subject the communication devices to error processing or the like.

Furthermore, in the present invention, when transmitting a notification that an unauthorized message has been transmitted or a notification that relay of the message is prohibited, the vehicle-mounted relay device outputs a notification of the identification information contained in the message determined to be unauthorized. Accordingly, the communication device that has received the notification from the vehicle-mounted relay device can recognize the identification information contained in an unauthorized message or a message that is highly likely to be unauthorized, and can perform error processing or the like if having received a message containing this identification information.

Furthermore, in the present invention, the communication device that has received the notification from the vehicle-mounted relay device stores the notified identification information. If having received a message containing the stored identification information, each communication device discards the message. Accordingly, it is possible to discard an unauthorized message or a message that is highly likely to be unauthorized at each communication device, and prevent an occurrence of malfunction and the like of the communication device.

Advantageous Effects of Invention

According to the present invention, by configuring the vehicle-mounted relay device so that it prohibits relay of unauthorized messages, and outputs a notification to communication lines connected to a plurality of communication lines, it is possible to prevent unauthorized messages from being relayed between the communication lines, and prevent occurrence of malfunction and the like of a communication device due to unauthorized messages.

BRIEF DESCRIPTION OF DRAWINGS

FIG. 8 is a flowchart illustrating a procedure of processing performed by the vehicle-mounted relay device of the present embodiment when an IG is turned ON.

DETAILED DESCRIPTION OF PREFERRED EMBODIMENTS

Figure 1:
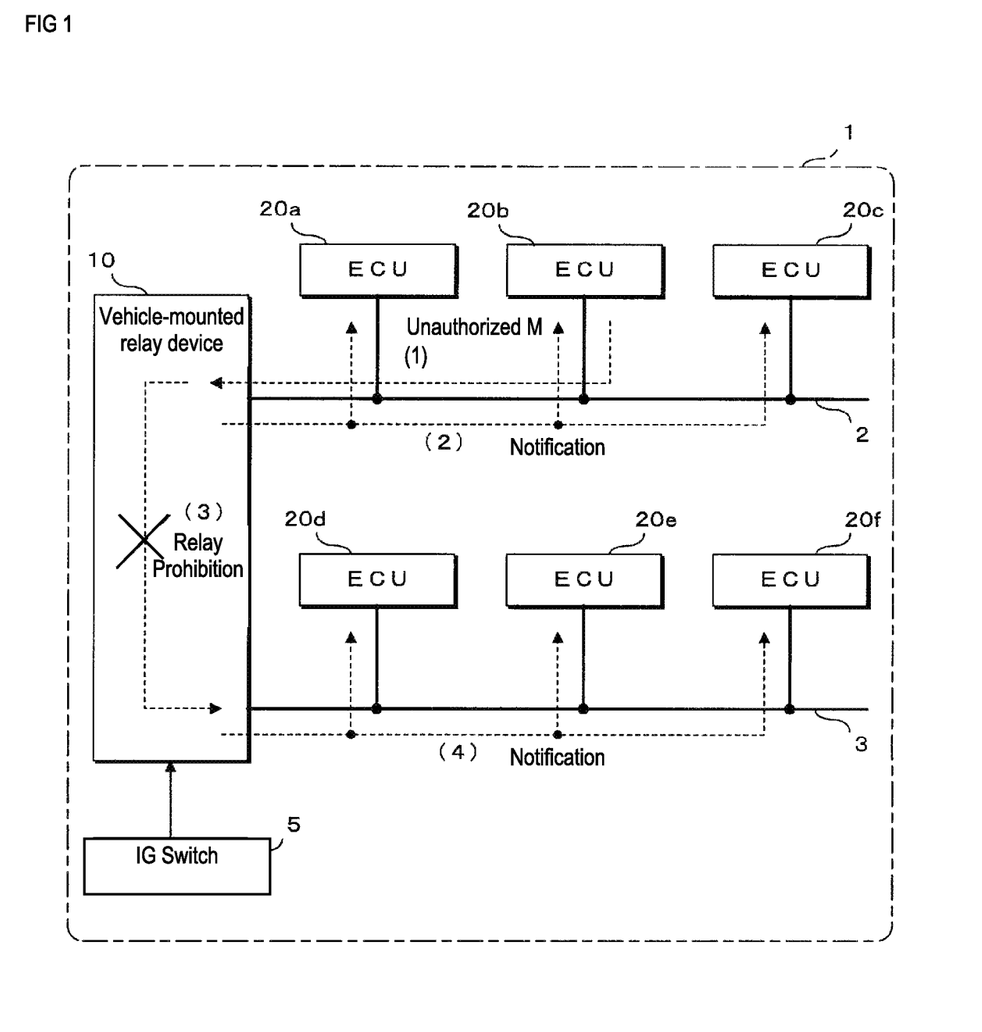
FIG. 1 is a block diagram illustrating a configuration of a vehicle-mounted communication system according to the present embodiment.

Hereinafter, the present invention will specifically be described with reference to the drawings illustrating the embodiments. FIG. 1 is a block diagram illustrating a configuration of a vehicle-mounted communication system according to the present embodiment. The vehicle-mounted communication system of the present embodiment is provided with a vehicle-mounted relay device 10 and a plurality of ECUs (Electronic Control Units) 20 (20a to 20f) that are installed in a vehicle 1. In the shown example, six ECUs 20a to 20f are installed in the vehicle 1, and are divided into two groups. Three ECUs 20a to 20c of a first group are connected to a first CAN bus 2, and can transmit and receive messages to and from each other via this CAN bus 2. Similarly, three ECUs 20d to 20f of a second group are connected to a second CAN bus 3, and can transmit and receive messages to and from each other via this CAN bus 3.

The two CAN buss 2 and 3 are not directly connected to each other, and are connected to the vehicle-mounted relay device 10. The vehicle-mounted relay device 10 is a device that acquires a message output to, for example, one CAN bus 2, and outputs the acquired message to the other CAN bus 3, so as to perform message relay between the groups (between networks or CAN buss).

In the vehicle-mounted communication system having the above-described configuration, if, for example, an unauthorized ECU is connected to the CAN bus 2 or 3 or if any of the regular ECUs 20a to 20f is affected by an electronic virus or the like, then an unauthorized message may be transmitted to the CAN bus 2 or 3. For example, in FIG. 1, it is assumed that the ECU 20b connected to the CAN bus 2 is an unauthorized ECU. The unauthorized ECU 20b transmits an unauthorized message to the CAN bus 2 (see "(1) Unauthorized M" of FIG. 1). The unauthorized message transmitted to the CAN bus 2 is received by the other ECUs 20a and 20c connected to the CAN bus 2, and is received by the vehicle-mounted relay device 10.

In the vehicle-mounted communication system according to the present embodiment, any message that is transmitted by the ECUs 20a to 20f contains authorization information. When having received a message transmitted to the CAN bus 2, the vehicle-mounted relay device 10 of the present embodiment determines whether or not the message is authorized by determining whether or not authorization information contained in the message is authorized. If it is determined that the received message is unauthorized, then the vehicle-mounted relay device 10 gives a notification that an unauthorized message has been transmitted to the CAN bus 2 that has received this message (see "(2) Notification" of FIG. 1). When having received the notification from the vehicle-mounted relay device 10, the ECUs 20a to 20c connected to the CAN bus 2 can recognize that the previously received message was an unauthorized message. The ECUs 20a to 20c can perform processing such as, for example, discarding the previously received unauthorized message, or cancelling a treatment performed based on the previously received unauthorized message.

Furthermore, when having received a message transmitted to the CAN bus 2, the vehicle-mounted relay device 10 typically transmits the message to the CAN bus 3, so as to performs message relay. Note, however, that if it is determined that the message received on the CAN bus 2 is an unauthorized message, the vehicle-mounted relay device 10 of the present embodiment does not transmit this message to the CAN bus 3. Furthermore, the vehicle-mounted relay device 10 stores a CAN-ID contained in the unauthorized message, and if a message that is received thereafter contains the stored CAN-ID, the vehicle-mounted relay device 10 does not relay the message (see "(3) Relay Prohibition" of FIG. 1).

When the vehicle-mounted relay device 10 has prohibited message relay, it outputs a notification that message relay is prohibited to the CAN bus 3, which is different from the CAN bus 2 that has received the unauthorized message (see "(4) Notification" of FIG. 1). At this time, the vehicle-mounted relay device 10 gives the notification with the CAN-ID of the message that is to be prohibited from being relayed. Upon receiving the notification from the vehicle-mounted relay device 10, the ECUs 20d to 20f connected to the CAN bus 3 can recognize that a message with the specific CAN-ID will not be relayed thereafter, and can perform appropriate processing corresponding to this notification.

Furthermore, a signal (hereinafter, referred to as "IG signal") that indicates an ON/OFF state of an IG (ignition) switch 5 of the vehicle 1 is given to the vehicle-mounted relay device 10 of the present embodiment. As described above, the vehicle-mounted relay device 10 stores the CAN-ID of an unauthorized message to be prohibited from being relayed, and outputs a notification of the stored CAN-ID to all of the CAN buses 2 and 3 if the IG switch 5 is switched from the OFF state to the ON state. The ECUs 20a to 20f that have received the notification can perform error processing or the like, as needed.

Figure 2:
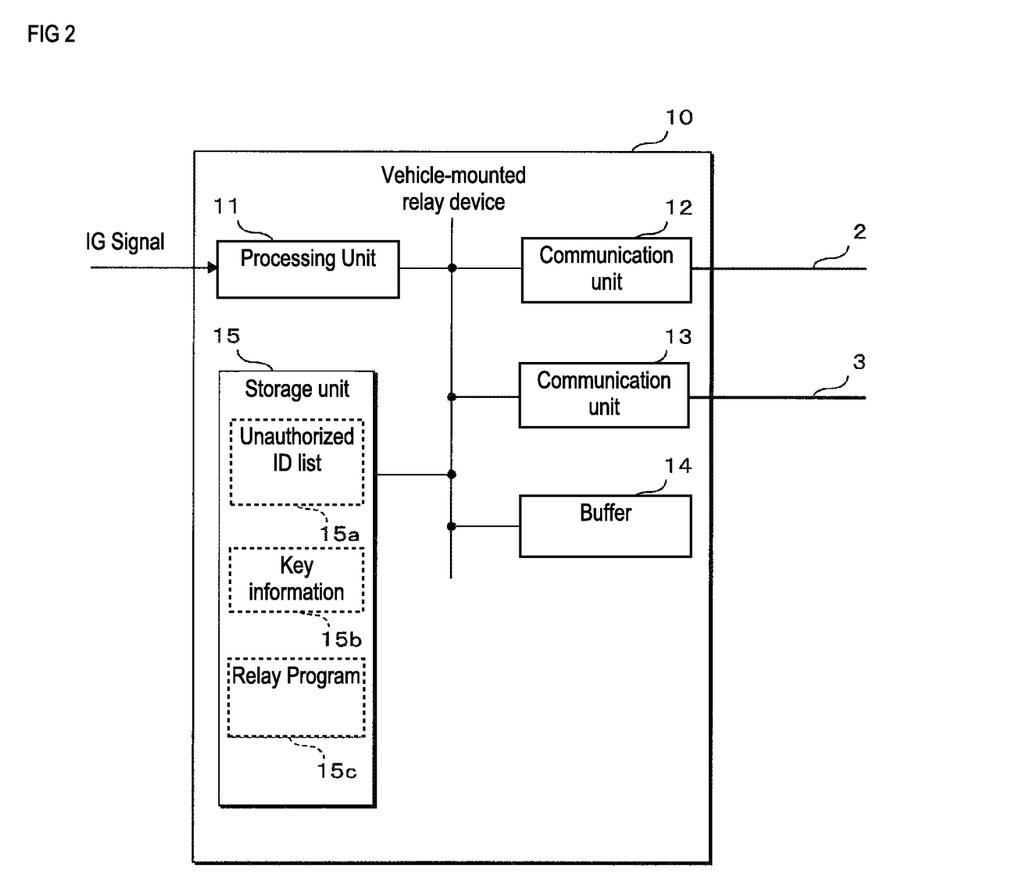
FIG. 2 is a block diagram illustrating a configuration of a vehicle-mounted relay device according to the present embodiment.

FIG. 2 is a block diagram illustrating a configuration of the vehicle-mounted relay device 10 according to the present embodiment. The vehicle-mounted relay device 10 according to the present embodiment is provided with a processing unit 11, two communication units 12 and 13, a buffer 14, a storage unit 15, and the like. The processing unit 11 is configured with, for example, an arithmetic processing unit such as a CPU (Central Processing Unit) or an MPU (Micro-Processing Unit), and performs various types of processing by executing a relay program 15c stored in the storage unit 15, a not-shown ROM (Read Only Memory) or the like. The processing unit 11 of the present embodiment performs, for example, processing of determining whether or not a received message is authorized, processing of relaying a message, processing of prohibiting message relay, processing of performing notification about an unauthorized message, and the like.

The CAN buses 2 and 3 are respectively connected to the communication units 12 and 13, and the communication units 12 and 13 transmit and receive messages to and from the ECUs 20a to 20f via the CAN buses 2 and 3. The communication units 12 and 13 may be configured with a so-called CAN controller. The communication units 12 and 13 receive messages by sampling and acquiring signals output by the ECUs 20a to 20f to the CAN buses 2 and 3, store the received messages in the buffer 14, and notify the processing unit 11 of the fact that the message has been received. Furthermore, the communication units 12 and 13 read messages to be transmitted that are stored in the buffer 14 in response to an instruction from the processing unit 11 and output the read messages, serving as signals, to the CAN buses 2 and 3, so as to perform message transmission to the ECUs 20a to 20f.

The buffer 14 is configured with a memory device such as, for example, an SRAM (Static Random Access Memory) or a DRAM (Dynamic Random Access Memory). The buffer 14 temporarily stores messages received by the communication units 12 and 13, messages to be transmitted thereafter, and the like.

The storage unit 15 is configured with a rewritable nonvolatile memory device such as an EEPROM (Electrically Erasable Programmable Read Only Memory) or a flash memory, for example. In the present embodiment, an unauthorized ID list 15a, key information 15b, the relay program 15c, and the like are stored in the storage unit 15. The unauthorized ID list 15a is a list of CAN-IDs that are contained in messages that were received by the vehicle-mounted relay device 10, and were determined to be unauthorized as a result of authorization determination processing. The key information 15b is information for use in generating and checking authorization information contained in messages that are transmitted and received to and from the ECUs 20a to 20f. The relay program 15c is a program that is read and executed by the processing unit 11 thereby to realize message relay processing, relay prohibition processing, notification processing, and the like.

Figure 3:
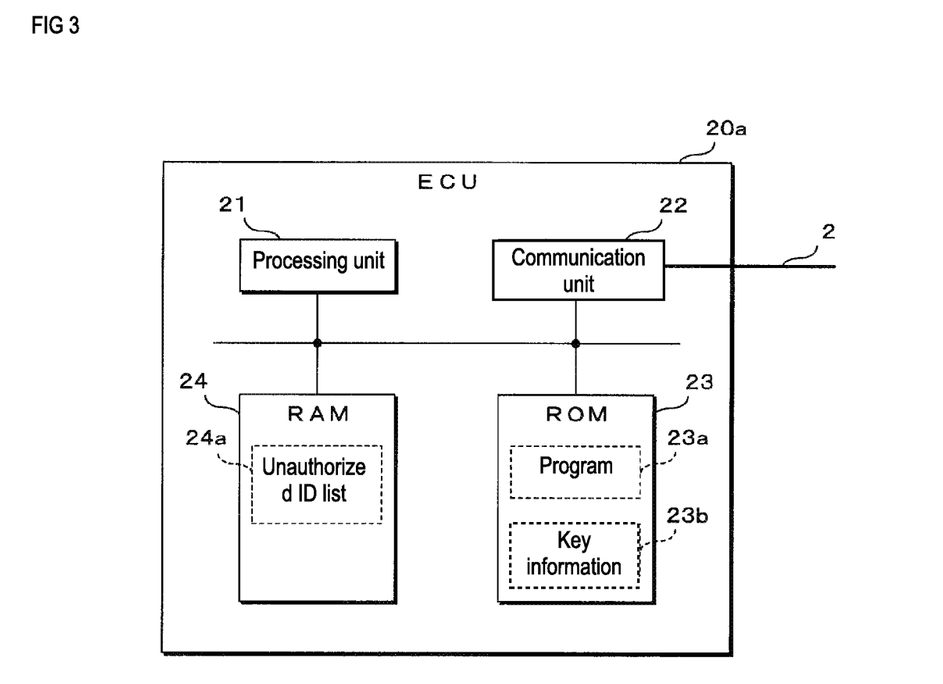
FIG. 3 is a block diagram illustrating an example of a configuration of an ECU according to the present embodiment.

FIG. 3 is a block diagram illustrating an example of a configuration of the ECU 20a of the present embodiment. Note that in FIG. 3, communication-related functional blocks of the ECU 20a are extracted and shown. Furthermore, the other ECUs 20b to 20f have the same configuration as that of the ECU 20a, and thus illustration thereof will be omitted. The ECU 20a of the present embodiment is provided with a processing unit 21, a communication unit 22, a ROM 23, a RAM (Random Access Memory) 24, and the like. The processing unit 21 is configured with an arithmetic processing unit such as a CPU or an MPU, and performs various types of processing by executing a program 23a stored in the ROM 23.

The communication unit 22 to which the CAN bus 2 is connected transmits and receives messages to and from the other ECUs 20b to 20f via the CAN bus 2 and the vehicle-mounted relay device 10. The communication unit 22 may be configured with a so-called CAN controller. The communication unit 22 receives a message by sampling and acquiring a signal output by any one of the other ECUs 20b to 20f or the vehicle-mounted relay device 10 to the CAN bus 2, stores the received message in the RAM 24, and notifies the processing unit 21 of the fact that the message has been received. Furthermore, the communication unit 22 reads a message to be transmitted that is stored in the RAM 24 in response to an instruction from the processing unit 21 and outputs the read message, serving as a signal, to the CAN bus 2, so as to perform message transmission to the other ECUs 20b to 20f and the vehicle-mounted relay device 10.

The ROM 23 is configured with a nonvolatile memory device such as a mask ROM, an EEPROM, or a flash memory, for example. In the present embodiment, the ROM 23 stores the program 23a, key information 23b, and the like. The program 23a is read and executed by the processing unit 21 and thereby realizes communication processing according to the present embodiment, functional processing specific for each of the ECUs, and the like. The key information 23b is information for use in generating and checking authorization information contained in messages transmitted and received to and from the other ECUs 20b to 20f and the vehicle-mounted relay device 10. Note that the key information 15b stored in the vehicle-mounted relay device 10 and the key information 23b stored in the ECUs 20a to 20f have the same value.

The RAM 24 is configured with a memory device such as an SRAM or a DRAM, for example. The RAM 24 temporarily stores information generated during the processing of the processing unit 21, messages to be transmitted and received by the communication unit 22, and the like. Furthermore, in the present embodiment, the RAM 24 stores an unauthorized ID list 24a. The unauthorized ID list 24a is a list of CAN-IDs of unauthorized messages notified by the vehicle-mounted relay device 10.

Figure 4:
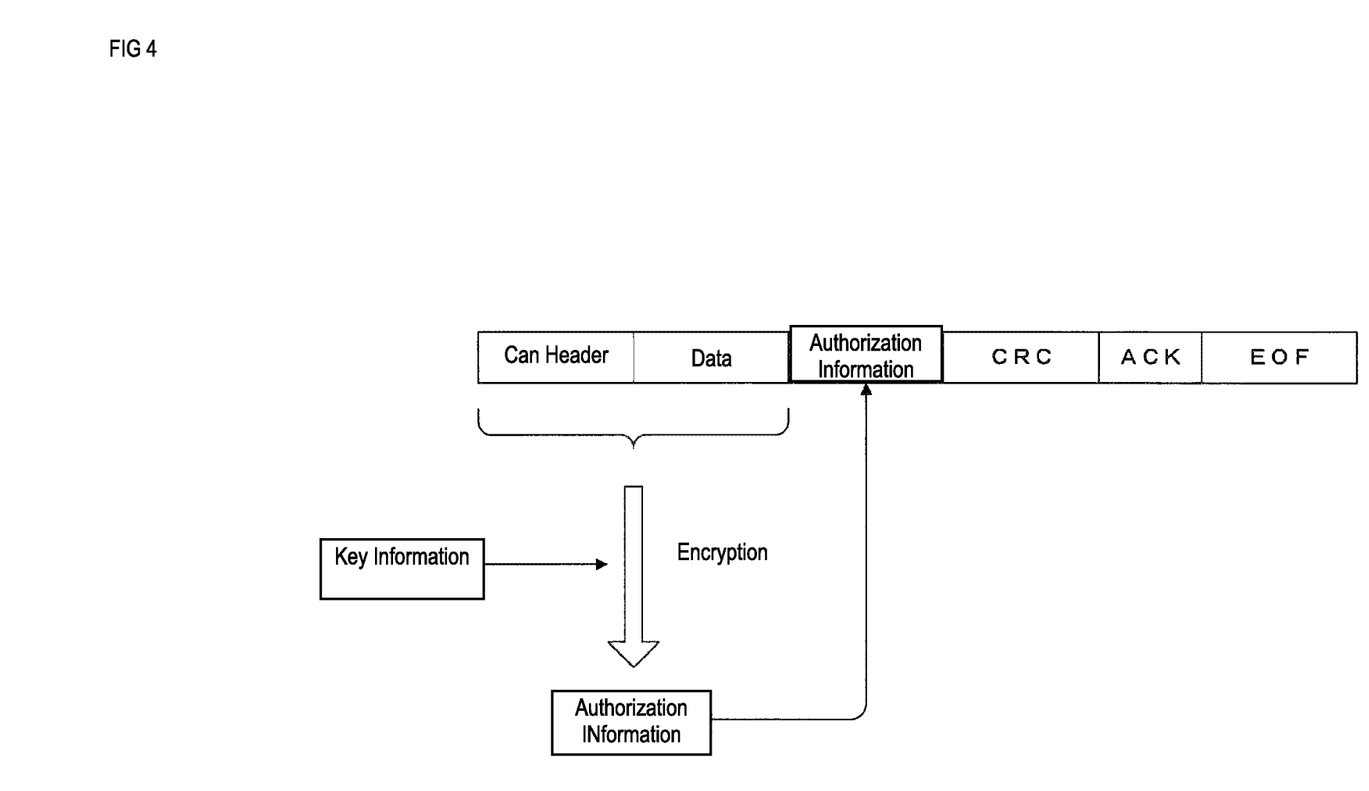
FIG. 4 is a schematic diagram illustrating an example of a configuration of a message to be transmitted and received in the vehicle-mounted communication system of the present embodiment.

FIG. 4 is a schematic diagram illustrating an example of a configuration of a message that is transmitted and received in the vehicle-mounted communication system according to the present embodiment. Messages that are transmitted and received in vehicle-mounted communication system of the present embodiment are configured to contain a CAN header, a data field, authorization information, a CRC (Cyclic Redundancy Check) field, an ACK (acknowledgement) field, and an EOF (End Of Frame). The CAN header includes SOF (Start Of Frame), an arbitration field, a control field, and the like of a conventional CAN protocol, and also includes the above-described CAN-ID. For example, the main part of information to be given and received between the ECUs 20a to 20f such as control instruction of the other ECUs 20a to 20f or a result of detection of a sensor is stored in the data field.

The CRC field, the ACK field, and the EOF are the same as those that are used in a conventional CAN protocol, and thus detailed description thereof will be omitted. The CRC field stores information for use in performing error detection. The ACK field is a field in which the ECUs 20a to 20f and the vehicle-mounted relay device 10 that receive this frame perform reception and response. The EOF is a specific bit sequence indicating the end of the field.

Different from a message of a conventional CAN protocol, the message of the present embodiment includes authorization information. The authorization information is information that is used for the vehicle-mounted relay device 10 to determine whether or not this message is authorized. The processing units 21 of the ECUs 20a to 20f generate authorization information by encrypting a CAN header and data included in a message to be transmitted using the key information 23b stored in the storage unit 23. In the present embodiment, for example, an HMAC (SHA-256) algorithm is used to generate a message authenticator (MAC) of 256 bits based on the key information 23b of about 512 bits. The processing unit 21 of each of the ECUs 20a to 20f adds the generated MAC of 256 bits, serving as authorization information, to the message to be transmitted, and gives the communication unit 22 an instruction of transmitting the message, thereby to perform message transmission to other ones of the ECUs 20a to 20f.

Note that in the present embodiment, the vehicle-mounted relay device 10 performs processing of determining whether or not a received message is authorized, and the ECUs 20a to 20f do not need to determine whether or not the authorization information contained in the received message is authorized. Therefore, the plurality of ECUs 20a to 20f do not need to share the same key information 23b, and it is sufficient that at least the vehicle-mounted relay device 10 and each of the ECUs 20a to 20f share the same key information 15b and 23b. However, a configuration is also possible in which the ECUs 20a to 20f perform processing of determining whether or not authorization information contained in a received message is authorized.

The processing unit 11 of the vehicle-mounted relay device 10 that has received at the communication unit 12 or 13 a message transmitted by any of the ECUs 20a to 20f determines whether or not the message is authorized by determining whether or not authorization information contained in the received message is authorized. The processing unit 11 reads the key information 15b stored in the storage unit 15, and generates authorization information using the same algorithm as in the ECUs 20a to 20f based on the read key information 15b and the CAN header and data field of the received message. The processing unit 11 compares the authorization information that was generated by itself and the authorization information contained in the received message, and determines that this message is authorized if both pieces of authorization information match each other. If both pieces of the authorization information do not match each other, then the processing unit 11 determines that the message is unauthorized.

If it is determined that the received message is unauthorized, then the processing unit 11 of the vehicle-mounted relay device 10 outputs a predetermined message to the CAN bus 2 or 3 connected to the communication unit 12 or 13 that has received that message so as to notify the corresponding ECUs 20a to 20f connected to that CAN bus 2 or 3 of the fact that an unauthorized message has been transmitted. At this time, the message that is transmitted as a notification by the vehicle-mounted relay device 10 has the message format shown in FIG. 4, in which the CAN-ID contained in the CAN header serves as an ID for notification, and the CAN-ID contained in the message determined to be unauthorized is stored in the data field. A value such as "010" for example, can be set for the ID for notification in advance, and may preferably be a value with high priority in the arbitration processing of a CAN protocol. Furthermore, the notification message does not need to contain authorization information.

The corresponding ECUs 20a to 20f that have received from the vehicle-mounted relay device 10 a notification that an unauthorized message has been transmitted perform predetermined error processing and the like, and register the CAN-ID of the unauthorized message that is contained in the notification message in the unauthorized ID list 24a of its RAM 24. At this time, the corresponding ECUs 20a to 20f may discard a previously received unauthorized message if possible. Thereafter, if having received a message, the corresponding ECUs 20a to 20f determine whether or not the CAN-ID of the received message is registered in their unauthorized ID lists 24a. If the CAN-ID of the received message is registered in their unauthorized ID lists 24a, the corresponding ECUs 20a to 20f discard the message without performing processing using this message.

Furthermore, if it is determined that the received message is unauthorized, then the processing unit 11 of the vehicle-mounted relay device 10 does not relay this message. Furthermore, the processing unit 11 registers the CAN-ID of the message determined to be unauthorized in the unauthorized ID list 15a of the storage unit 15, and thereby prohibits any further relaying of a message that has the same ID. That is, the processing unit 11 determines, when having received a message, whether or not the CAN-ID of this message is registered in the unauthorized ID list 15a. If the CAN-ID of the received message is registered in the unauthorized ID list 15a, then the processing unit 11 does not relay the message regardless of whether or not the authorization information contained in the message is authorized.

If it is determined that the received message is unauthorized, then the processing unit 11 of the vehicle-mounted relay device 10 outputs a predetermined message to the CAN bus 2 or 3 connected to the communication unit 12 or 13 other than the communication unit 12 or 13 that has received the message, so as to notify the corresponding ECUs 20a to 20f that are connected to that CAN bus 2 or 3 of the fact that relay of the message is prohibited. At this time, the message that is transmitted as a notification by the vehicle-mounted relay device 10 has the message format shown in FIG. 4, in which the CAN-ID contained in the CAN header serves as an ID for notification, and the CAN-ID contained in the message determined to be unauthorized is stored in the data field. This is the same configuration as that of the above-described message when giving a notification that an unauthorized message has been transmitted, but is distinguishable if different values are set for the CAN-IDs. Note, however, that CAN-IDs having the same value may be used for both notifications, and it is not necessary to distinguish the two notifications.

The ECUs 20a to 20f that have received from the vehicle-mounted relay device 10 the notification that relay is prohibited perform predetermined error processing or the like. For example, in a case where the ECUs 20a to 20f are configured to stand by for reception of a message with a desired CAN-ID, determine that communication is blocked if a predetermined time period elapses without them being able to receive the message, and execute error processing relating to timeout, error processing can be started without waiting for an elapse of a predetermined time period, upon receiving from the vehicle-mounted relay device 10 a notification that message relay is prohibited. Furthermore, the ECUs 20a to 20f that have received the notification that relay is prohibited register the CAN-ID of the unauthorized message that is contained in the notification message in their unauthorized ID lists 24a. However, in the present embodiment, the ECUs 20a to 20f do not necessarily register a message received through relay of the vehicle-mounted relay device 10 into their unauthorized ID lists 24a, since they no longer receive thereafter any message with a CAN-ID showing relay prohibition.

Furthermore, the vehicle-mounted relay device 10 of the present embodiment has the function of performing re-notification based on the unauthorized ID list 15a stored in the storage unit 15 when the IG switch 7 of the vehicle 1 is switched from the OFF state to the ON state. An IG signal indicating the ON/OFF state of the IG switch 7 is input to the processing unit 11 of the vehicle-mounted relay device 10. If it is determined based on the IG signal that the IG switch 7 has been changed from the OFF state to the ON state, then the processing unit 11 reads the unauthorized ID list 15a from the storage unit 15, and transmits a message of notification of CAN-IDs registered in the unauthorized ID list 15a from all of the communication units 12 and 13, so as to notify all of the ECUs 20a to 20f of the known unauthorized CAN-IDs. At this time, the message that is transmitted as a notification by the vehicle-mounted relay device 10 has the message format shown in FIG. 4, in which the CAN-ID contained in the CAN header serves as an ID for notification, and the CAN-IDs registered in the unauthorized ID list 15a are stored in the data field. This is the same configuration as those of the above-described messages when giving a notification that an unauthorized message has been transmitted and when giving a notification that relay is prohibited, but is distinguishable if different values are set for the CAN-IDs. Note, however, that a notification given when the IG is turned ON may use the CAN-ID having the same value as that of another notification, and it is not necessary to distinguish the two notifications. Furthermore, if a plurality of CAN-IDs are registered in the unauthorized ID list 15a, the vehicle-mounted relay device 10 may transmit the plurality of CAN-IDs by performing notification repeatedly a plurality of times, or may transmit the plurality of CAN-IDs in a single notification.

The each of the ECUs 20a to 20f that have received the notification given when the IG is turned ON from the vehicle-mounted relay device 10 registers the CAN-IDs transmitted together with the notification in the unauthorized ID list 24a of the RAM 24, and performs error processing as needed. In each of the ECUs 20a to 20f to which power supply is stopped if the IG switch 7 of the vehicle 1 is in the OFF state, the unauthorized ID list 24a stored in the RAM 24 may be deleted. As a result of the vehicle-mounted relay device 10 performing re-notification when the IG switch 7 is switched from the OFF state to the ON state and the power supply to the ECUs 20a to 20f is started, it is possible for the ECUs 20a to 20f to register again the unauthorized ID lists 24a in their RAMs 24. Accordingly, the ECUs 20a to 20f to which power supply is not stopped even when the IG switch 7 is turned OFF, and the ECUs 20a to 20f that store their unauthorized ID lists 24a in the nonvolatile memory devices, or the like do not need to perform re-registration of the unauthorized ID lists 24a in response to the re-notification from the vehicle-mounted relay device 10.

Figure 5:
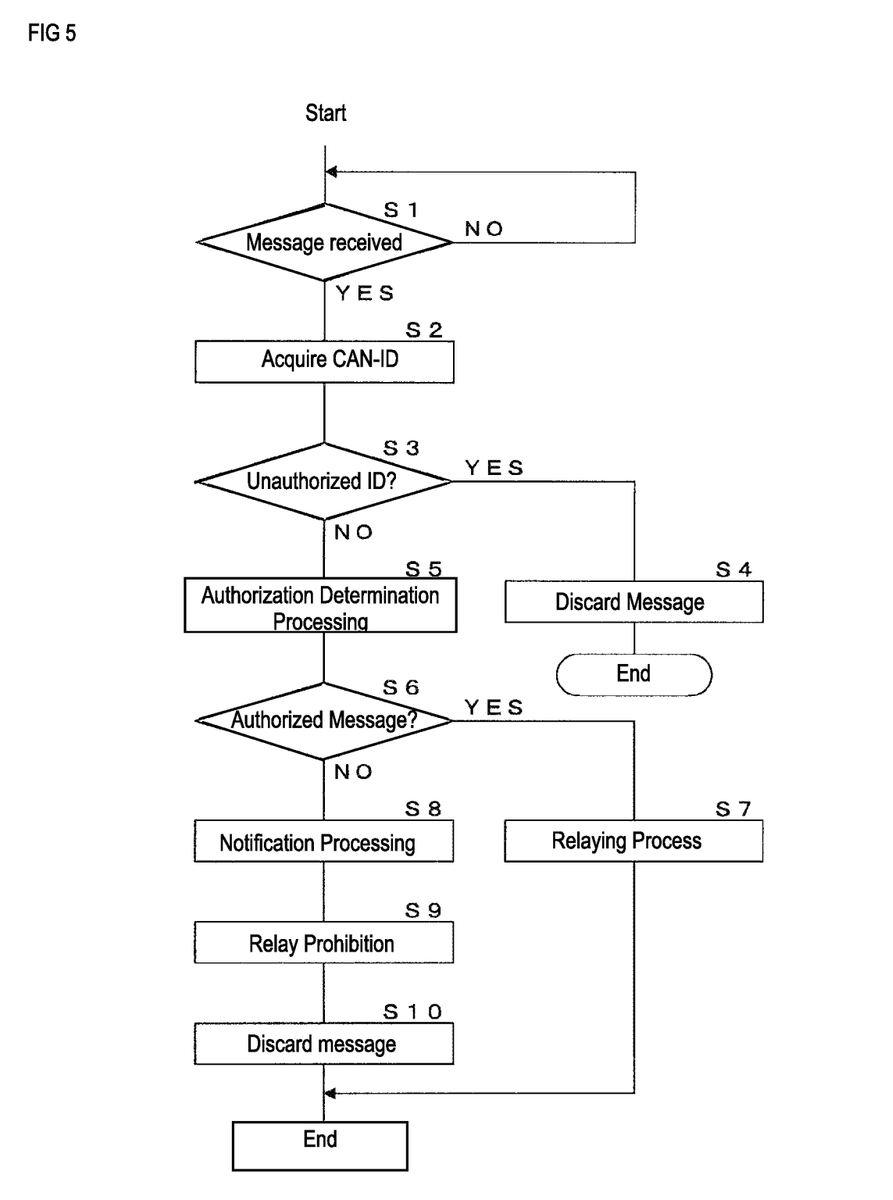
FIG. 5 is a flowchart illustrating a procedure of processing performed when the vehicle-mounted relay device of the present embodiment has received a message.

FIG. 5 is a flowchart illustrating a procedure of processing performed when the vehicle-mounted relay device 10 of the present embodiment has received a message. The processing unit 11 of the vehicle-mounted relay device 10 of the present embodiment determines whether or not a message is received by any of the communication units 12 and 13 (step S1). If no message is received (NO in step S1), then the processing unit 11 stands by until a message is received. If a message is received (Yes in step S1), then the processing unit 11 acquires the CAN-ID from the received message (step S2). The processing unit 11 determines whether or not the CAN-ID acquired in step S2 is registered as an unauthorized ID with reference to the unauthorized ID list 15a stored in the storage unit 15 (step S3). If the CAN-ID is a registered unauthorized ID (Yes in step S3), then the processing unit 11 discards the received message (step S4), and the procedure ends.

If the CAN-ID is not a registered unauthorized ID (No in step S3), then the processing unit 11 performs processing of determining whether or not authorization information contained in the received message is authorized based on the key information 15b stored in the storage unit 15 and the CAN header and data field contained in the received message (step S5). The processing unit 11 determines whether or not the received message is an authorized message based on the result of the authorization determination processing (step S6). If the received message is an authorized message (Yes in step S6), then the processing unit 11 performs message relay by transmitting this message to the corresponding CAN bus 2 or 3 connected to the other one of the communication units 12 and 13 (step S7), and the procedure ends.

If the received message is not an authorized message (No in step S6), then the processing unit 11 performs notification processing of giving a notification that an unauthorized message has been transmitted to the CAN bus 2 or 3 connected to the communication unit 12 or 13 that has received this message, and giving a notification that relay of the message is prohibited to the CAN bus 2 or 3 connected to the communication unit 12 or 13 other than the communication unit 12 or 13 that has received this message (step S8). The processing unit 11 registers the CAN-ID acquired in step S2 in the unauthorized ID list 15a of the storage unit 15, and thereby prohibits a message having this CAN-ID from being relayed (step S9). Furthermore, the processing unit 11 discards the received message (step S10), and the procedure ends. Note that the processing order of steps S8, S9, and S10 is not limited to the shown order, and any processing step may be performed at first.

Figure 6:
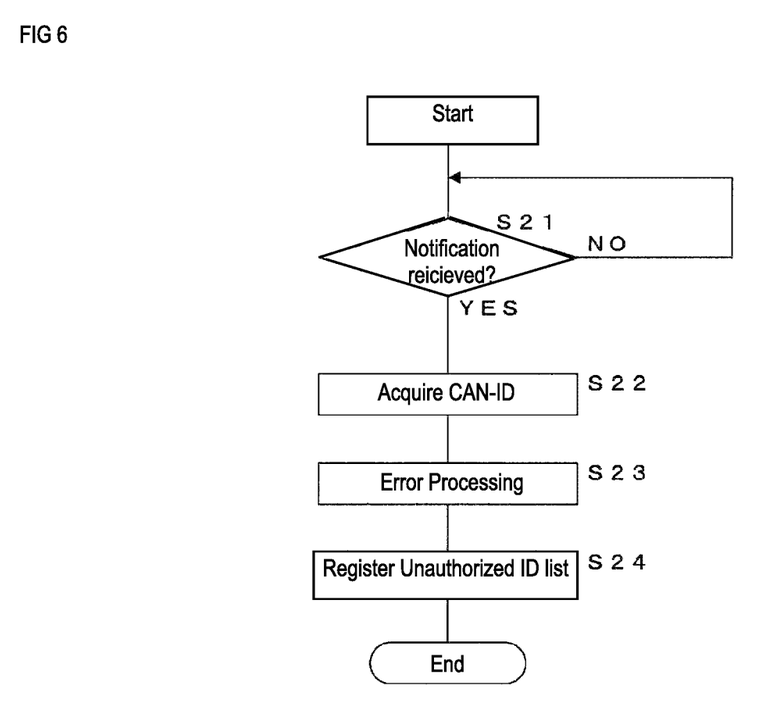
FIG. 6 is a flowchart illustrating a procedure of processing performed when the ECU of the present embodiment has received a notification from the vehicle-mounted relay device.

FIG. 6 is a flowchart illustrating a procedure of processing performed when the ECUs 20a to 20f of the present embodiment have received a notification from the vehicle-mounted relay device 10. The processing unit 21 of each of the ECUs 20a to 20f of the present embodiment determines whether or not the communication unit 22 has received a notification from the vehicle-mounted relay device 10 (step S21). Note that the notification in this case may be a notification that an unauthorized message has been transmitted, a notification that relay of the message is prohibited, or a re-notification given when the IG switch 7 is switched to ON state. If no notification has been received (No in step S21), then the processing unit 21 stands by until a notification is received.

If a notification has been received from the vehicle-mounted relay device 10 (Yes in step S21), then the processing unit 21 acquires the CAN-ID contained in the notification (step S22). The processing unit 21 performs error processing, as needed, based on the acquired CAN-ID and the like (step S23). Furthermore, the processing unit 21 registers the CAN-ID acquired in step S22 in the unauthorized ID list 24a of the RAM 24 (step S24), and the procedure ends.

Figure 7:
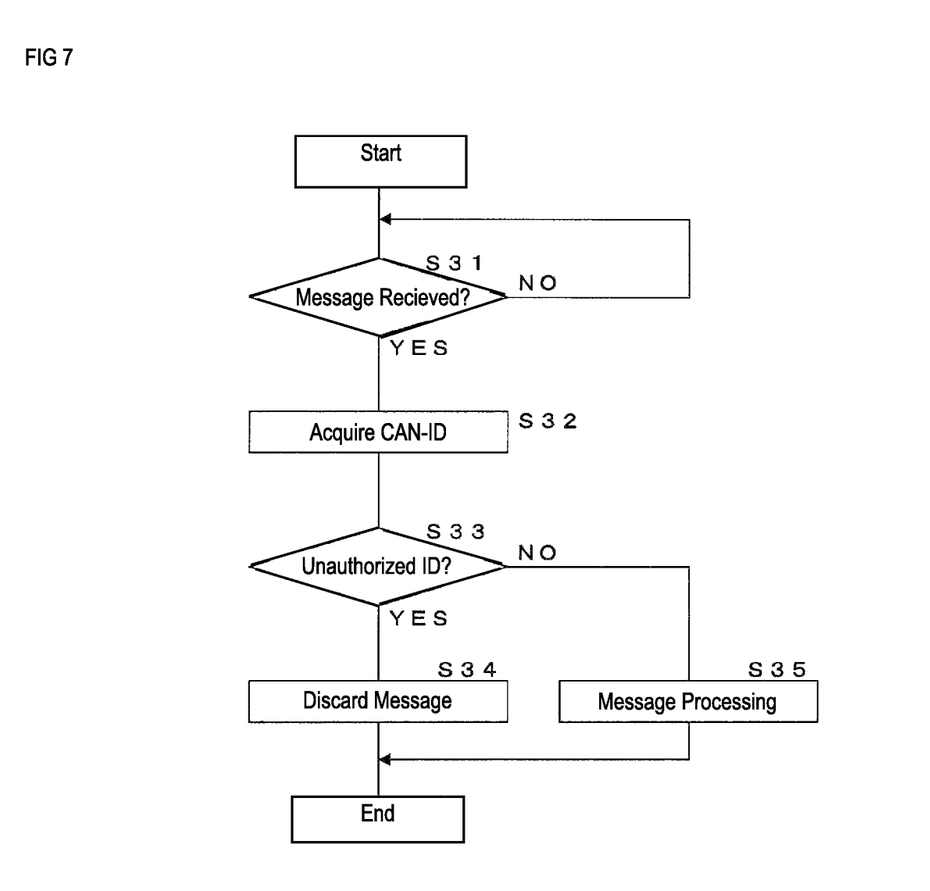
FIG. 7 is a flowchart illustrating a procedure of processing performed when the ECU of the present embodiment has received a message.

FIG. 7 is a flowchart illustrating a procedure of processing performed when the ECUs 20a to 20f of the present embodiment have received a message. The processing unit 21 of each of the ECUs 20a to 20f of the present embodiment determines whether or not the communication unit 22 has received a message from another one of the ECUs 20a to 20f or the vehicle-mounted relay device 10 (step S31). If no message has been received (No in step S31), then the processing unit 21 stands by until a message is received.

If a message has been received (Yes in step S31), then the processing unit 21 acquires the CAN-ID from the received message (step S32). The processing unit 21 determines whether or not the CAN-ID acquired in step S32 is registered as an unauthorized ID with reference to the unauthorized ID list 24a stored in the storage unit 24 (step S33). If the CAN-ID matches the registered unauthorized ID (Yes in step S33), then the processing unit 21 discards the received message (step S34), and the procedure ends. If the CAN-ID does not match the unauthorized ID (No in step S33), then the processing unit 21 performs processing that relates to the received message and is specific for the corresponding one of the ECUs 20a to 20f (step S35), and the procedure ends.

Figure 8:
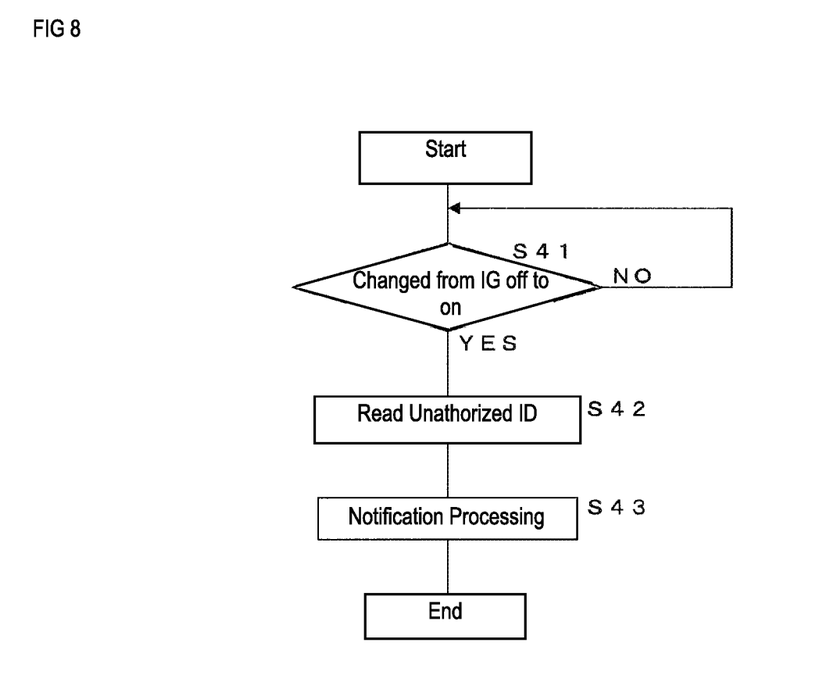

FIG. 8 is a flowchart illustrating a procedure of processing performed by the vehicle-mounted relay device 10 of the present embodiment when the IG is turned ON. The processing unit 11 of the vehicle-mounted relay device 10 of the present embodiment determines whether or not the IG switch 7 of the vehicle 1 is changed from the OFF state to ON state based on an input IG signal (step S41). If the IG switch 7 is not changed from the OFF state to the ON state, such as a case where, for example, the IG switch 7 is maintained in the ON state, the IG switch 7 is maintained in the OFF state, or the IG switch 7 is changed from the ON state to the OFF state (No in step S41), then the processing unit 11 stands by until the IG switch 7 is changed from the OFF state to the ON state.

If the IG switch 7 is changed from the OFF state to the ON state (Yes in step S41), then the processing unit 11 reads CAN-IDs of the unauthorized message that is registered in the unauthorized ID list 15a of the storage unit 15 (step S42). Then, the processing unit 11 transmitting the message containing the read CAN-IDs from the communication units 12 and 13 so as to perform notification of the unauthorized CAN-IDs (step S43), and the procedure ends.

In the vehicle-mounted communication system having the above-described configurations according to the present embodiment, the vehicle-mounted relay device 10 having the plurality of communication units 12 and 13 to which the plurality of CAN buses 2 and 3 are connected determines whether or not a message transmitted by any of the ECUs 20a to 20f connected to the CAN buses 2 and 3 is authorized. If it is determined that the message is unauthorized, then the vehicle-mounted relay device 10 gives a notification that an unauthorized message has been transmitted to the CAN bus 2 or 3 connected to the communication unit 12 or 13 that has received this message. Accordingly, the other ones of the ECUs 20a to 20f connected to the CAN bus 2 or 3 to which the one of the ECUs 20a to 20f that has transmitted the unauthorized message is connected can perform error processing such as, for example, discarding the received message in accordance with the notification from the vehicle-mounted relay device 10.

Furthermore, the vehicle-mounted relay device 10 prohibits any further relaying of a message that has the same CAN-ID as the CAN-ID contained in the message determined to be unauthorized. At this time, the vehicle-mounted relay device 10 gives a notification that relay of the message is prohibited to the communication line connected to the communication unit 12 or 13 other than the communication unit 12 or 13 that has received this message determined to be unauthorized. Accordingly, the ECUs 20a to 20f that are to receive a relayed message can recognize that relay of the message is prohibited, and can execute error processing or the like that corresponds to this.

Furthermore, the vehicle-mounted relay device 10 stores the CAN-IDs contained in messages determined to be unauthorized in the unauthorized ID list 15a of the storage unit 15, and transmits a message of notification of the stored CAN-IDs to the CAN buses 2 and 3 connected to the communication units 12 and 13 when the IG switch 7 of the vehicle 1 is changed from the OFF state to the ON state. Accordingly, even if the ECUs 20a to 20f include an ECU to which power supply is stopped when the IG switch 7 is in the OFF state and that loses stored information, it is possible to notify the ECUs 20a to 20f of the CAN-IDs of unauthorized messages, and subject the ECUs 20a to 20f to error processing or the like.

Furthermore, when transmitting a notification that an unauthorized message has been transmitted or a notification that relay of the message is prohibited, the vehicle-mounted relay device 10 gives a notification of the CAN-ID contained in the message determined to be unauthorized. Accordingly, the ECUs 20a to 20f that have received the notification from the vehicle-mounted relay device 10 can recognize the CAN-ID contained in the unauthorized message, and can perform error processing or the like if having received a message containing the CAN-ID.

Furthermore, the ECUs 20a to 20f that have received the notification from the vehicle-mounted relay device 10 store the notified CAN-ID in the unauthorized ID lists 24a of their RAMs 24. If having received a message containing the CAN-ID registered in the unauthorized ID list 24a, each of the ECUs 20a to 20f discards the message. Accordingly, it is possible to discard the unauthorized message at the ECUs 20a to 20f, and prevent an occurrence of malfunction and the like of the ECUs 20a to 20f.

Note that the present embodiment has a configuration in which two CAN buses 2 and 3 are connected to the vehicle-mounted relay device 10, but the present embodiment is not limited to this, and a configuration is also possible in which three or more CAN buses are connected. In this case, the vehicle-mounted relay device 10 only need to relay a message received at one CAN bus to the other two CAN buses. Furthermore, the present embodiment has a configuration in which three ECUs 20a to 20c and three 20d to 20f are respectively connected to the CAN buses 2 and 3, but the present invention is not limited to this. Any number of ECUs can be connected to a CAN bus.

Furthermore, a configuration is such that a message is provided with authorization information based on the key information 15b and 24b, in order that the vehicle-mounted relay device 10 determines whether or not the message is authorized, but the prevent invention is not limited to this. The method for determining whether or not a message is authorized may be a method other than such a method using authorization information. Furthermore, the ECUs 20a to 20f each have a configuration in which the unauthorized ID list 24a is stored in the RAM, but the present invention is not limited to this, and a configuration is also possible in which the unauthorized ID list 24a is stored in a rewritable non-volatile memory device such as an EEPROM or a flash memory.

Furthermore, the present embodiment, the vehicle-mounted relay device 10 transmits three types of notifications, namely, a notification that an unauthorized message has been transmitted, a notification that relay of the message is prohibited, and a notification given when the IG switch 7 is changed to the ON state. The three types of notifications may be configured to be distinguishable in view of the ECUs 20a to 20f, for example, by setting different values for the CAN-IDs of the messages to be transmitted as the notifications, or may be configured to be undistinguishable.

The invention claimed is:

1. A vehicle-mounted relay device to be installed in a vehicle, the vehicle-mounted relay device being configured to relay a message between at least two communication lines, each of the communication lines having a plurality of electronic control units each having a random access memory, the plurality of electronic control units transmitting a message received by one of the electronic control units of one of the at least two communication lines to one of the electronic control units in the other of the at least two communication lines, the message containing identification information for identifying the message, the vehicle-mounted relay device comprising:

a determination logic, a first notification logic, a prohibition logic, a second notification logic, a storage unit and a third notification logic, wherein the storage unit is a non-volatile memory and the determination logic, the first notification logic, the prohibition logic, the second notification unit logic and the third notification unit logic being an executable software program written on the non-volatile memory;

the determination logic configured to determine whether or not the message received by each of the plurality of electronic control units is authorized;

the first notification logic configured to output, to the communication line connected to a first electronic control unit of the plurality of electronic control units, the first electronic control unit being any one of the plurality of electronic control units that has received a message determined to be unauthorized by the determination logic, a notification that the unauthorized message has been transmitted;

the prohibition logic configured to prohibit any further relaying of a message that has the same identification information as the identification information contained in the message determined to be unauthorized by the determination logic;

the second notification logic configured to output, to the communication line connected to any one of the plurality of electronic control units other than the first electronic control unit, a notification that relay of the message is prohibited; and the storage unit configured to store the identification information of the unauthorized message contained in the message determined to be unauthorized by the determination logic; and the third notification logic configured to output to the at least two communication lines, when an ignition switch of the vehicle is switched from an OFF state to an ON state, a re-notification of the identification information of the unauthorized message stored in the storage unit so as to transmit the identification information of the unauthorized message to each of the plurality of electronic control units.

2. The vehicle-mounted relay device according to claim 1, wherein the first notification logic and the second notification logic perform notification of the identification information contained in the message determined to be unauthorized by the determination logic.

3. A vehicle-mounted communication system comprising:
the vehicle-mounted relay device according to claim 2; and
a plurality of communication devices that are connected to one of the plurality of communication lines connected to the plurality of electronic control units of the vehicle-mounted relay device, and transmit and receive a message through the communication line,
wherein the communication devices include:
a storage unit configured to store identification information of the unauthorized message notified by the vehicle-mounted relay device; and
a discarding logic configured to, if a message containing the identification information of the unauthorized message stored in the storage unit is received, discard the message.

4. A relay program product comprising a non-transitory, machine-readable medium storing instructions which, when executed by at least one programmable processor, caused at least one programmable processor to cause a vehicle-mounted relay device that is installed in a vehicle, the relay device configured to relay a message between at least two communication lines, each of the communication lines is provided with a plurality of electronic control units each having a random access memory, the plurality of electronic control units transmitting a message received by one of the electronic control units of one of the at least two communication lines to one of the electronic control units in the other of the at least two communication lines, wherein the message contains identification information for identifying the message, to determine whether or not the message received by the electronic control units is authorized, to output, to the communication line connected to a first electronic control unit, the first electronic control unit being anyone of the plurality of electronic control units that has received a message determined to be unauthorized, a notification that the unauthorized message has been transmitted, to prohibit any further relaying of a message that has the same identification information of the unauthorized message as the identification information contained in the message determined to be unauthorized, to output, to the communication line connected to anyone of the plurality of electronic control units other than the first electronic control unit, a notification that relay of the message is prohibited; and to store the identification information of the unauthorized message contained in the message determined to be unauthorized in a storage unit; and to output to the at least two communication lines a re-notification of the identification information of the unauthorized message stored in the storage unit, when an ignition switch of the vehicle is switched from an OFF state to an ON state so as to transmit the identification information of the unauthorized message to each of the plurality of electronic control units.

* * * * *